United States Patent
Sabdad

(10) Patent No.: US 10,967,802 B2
(45) Date of Patent: Apr. 6, 2021

(54) STORAGE COMPARTMENT OF A VEHICLE

(71) Applicant: Volvo Car Corporation, Gothenburg (SE)

(72) Inventor: Mahvan Pour Sabdad, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 127 days.

(21) Appl. No.: 16/297,779

(22) Filed: Mar. 11, 2019

(65) Prior Publication Data

US 2020/0290517 A1 Sep. 17, 2020

(51) Int. Cl.
*B60R 7/02* (2006.01)
*B60R 11/00* (2006.01)

(52) U.S. Cl.
CPC .............. *B60R 7/02* (2013.01); *B60R 11/00* (2013.01); *B60R 2011/0036* (2013.01); *B60R 2011/0038* (2013.01)

(58) Field of Classification Search
CPC .. B60R 5/02; B60R 5/04; B60R 5/044; B60R 11/00; B60R 7/02
USPC .............. 296/37.16, 24.34, 37.2, 37.3, 37.1
See application file for complete search history.

(56) References Cited

U.S. PATENT DOCUMENTS

| | | | |
|---|---|---|---|
| 6,568,732 B2 | 5/2003 | De Gaillard | |
| 7,806,453 B2 | 10/2010 | Aebker | |
| 9,387,807 B2 | 7/2016 | Horst et al. | |
| 9,527,450 B1 * | 12/2016 | Bellis | B62D 25/082 |
| 9,527,451 B2 | 12/2016 | Krishnan et al. | |
| 9,827,916 B1 | 11/2017 | Singer | |
| 10,081,235 B2 | 9/2018 | Freitas et al. | |
| 2005/0248169 A1 | 11/2005 | Clark et al. | |
| 2007/0012695 A1 | 1/2007 | Yang | |
| 2008/0100082 A1 * | 5/2008 | Heo | B60R 7/02 296/37.16 |
| 2008/0145172 A1 * | 6/2008 | Sturt | B60R 7/02 410/118 |
| 2013/0186442 A1 | 7/2013 | Carlson | |
| 2016/0229347 A1 | 8/2016 | Warnecke | |

FOREIGN PATENT DOCUMENTS

| | | | | |
|---|---|---|---|---|
| DE | 102018131250 B3 * | 4/2020 | .............. | B60R 5/02 |
| GB | 2522792 A | 5/2015 | | |
| WO | 2006013237 A1 | 2/2006 | | |

* cited by examiner

*Primary Examiner* — Joseph D. Pape
(74) *Attorney, Agent, or Firm* — Clements Bernard Walker; Christopher L. Bernard

(57) ABSTRACT

Storage compartments for use in or on vehicles are provided. A storage compartment, according to one implementation, may include a container body having a cavity adapted to store items or cargo. The container body may be adapted to be secured to a vehicle. The storage compartment may further include a fabric cover attached to a top edge of the container body.

21 Claims, 3 Drawing Sheets

STORAGE COMPARTMENT OF A VEHICLE

TECHNICAL FIELD

The present disclosure is generally directed to the automotive field. More particularly, the present disclosure relates to storage compartments that may be installed in or on vehicles.

BACKGROUND

There currently exist many types, styles, and models of vehicles. These different vehicles are typically designed with various types of engines and motors positioned at different locations within the vehicles. Also, the passenger space of different vehicles may vary widely, the designed spaces of which may range from two-passenger vehicles to multi-passenger vans. After designing the operational equipment and the passenger spaces of a vehicle, a designer may then attempt to take advantage of extra spaces that can be used as storage spaces for hauling cargo and various items. For some vehicles, such as pick-up trucks, a designated cargo space (e.g., the bed of the pick-up truck) may be a more significant part of the design process.

In some vehicles, such as electric vehicles and vehicles with a rear-mounted engine, extra space may be available for storage at the front end of the vehicle. As such, under the front hood of such a vehicle, a person would not find a conventional engine compartment, but perhaps a storage space or trunk. This trunk located in the front of a vehicle is sometimes referred to as a "frunk."

A typical frunk can be accessed by opening the front hood of the vehicle. Some frunks may be designed as a plastic container with a hinged plastic lid. Since the frunk may typically be located in a space that is not completely isolated from the environment, the plastic lid can help to protect any items within the container from objects, dust, smoke, etc. that may exist within the space commonly occupied by an engine of a conventional vehicle. The plastic lid can also protect the stored items from grease and pieces of automotive components that may normally exist under the hood.

Although frunks can provide a practical application of this extra space, one problem with the conventional plastic lid of frunks is that the lid may only be able to open by a certain amount before it contacts the underside of the hood, thus limiting the range of motion of the lid and interfering with the process of placing objects into the frunk or taking objects out of the frunk. Also, the plastic lid is typically bulky and includes a fixed shape that may be awkward for a user to work around. For instance, a user may have difficulty inserting large and/or odd-shaped objects into or removing these objects from such a frunk having a large lid.

Therefore, there is a need for improved vehicle storage compartments that can be installed in or on a vehicle, where the storage compartments can protect the stored items from the environment while also allowing a user to easily insert or remove items.

SUMMARY

Accordingly, storage compartments for use in or on a vehicle are described in the present disclosure. One embodiment of a storage compartment may include a container body having a cavity adapted to store cargo, where the container body may be adapted to be secured to a vehicle. The storage compartment may further include a fabric cover attached to a top edge of the container body.

According to another embodiment, a frunk is provided, where the frunk may include a container having a body, a top edge of the body, and a rim extending outward from the top edge, the body of the container being adapted to store cargo. The rim may be secured to support members under a front hood of the vehicle. The frunk may further include a cover adapted to conceal the cargo stored in the body of the container. For example, the cover may include a frame section and a fabric flap, where the frame section may be adapted to be attached to a top edge of the container body.

According to yet another embodiment, the present disclosure further provides a vehicle, which may include a support structure adapted to support automotive components that may be used for driving the vehicle and a storage compartment secured to the support structure. The storage compartment may include a plastic container and a fabric cover, where the plastic container may have a cavity adapted to store cargo. An outer edge of the fabric cover may be attached to a top edge of the plastic container.

BRIEF DESCRIPTION OF THE DRAWINGS

The present disclosure is directed to various embodiments illustrated and described herein with reference to the various drawings, in which like reference numbers are used to denote like system or assembly components/methods or algorithm steps. The illustrated components of the various systems are not necessarily drawn to scale.

DESCRIPTION OF EMBODIMENTS

Figure 1:
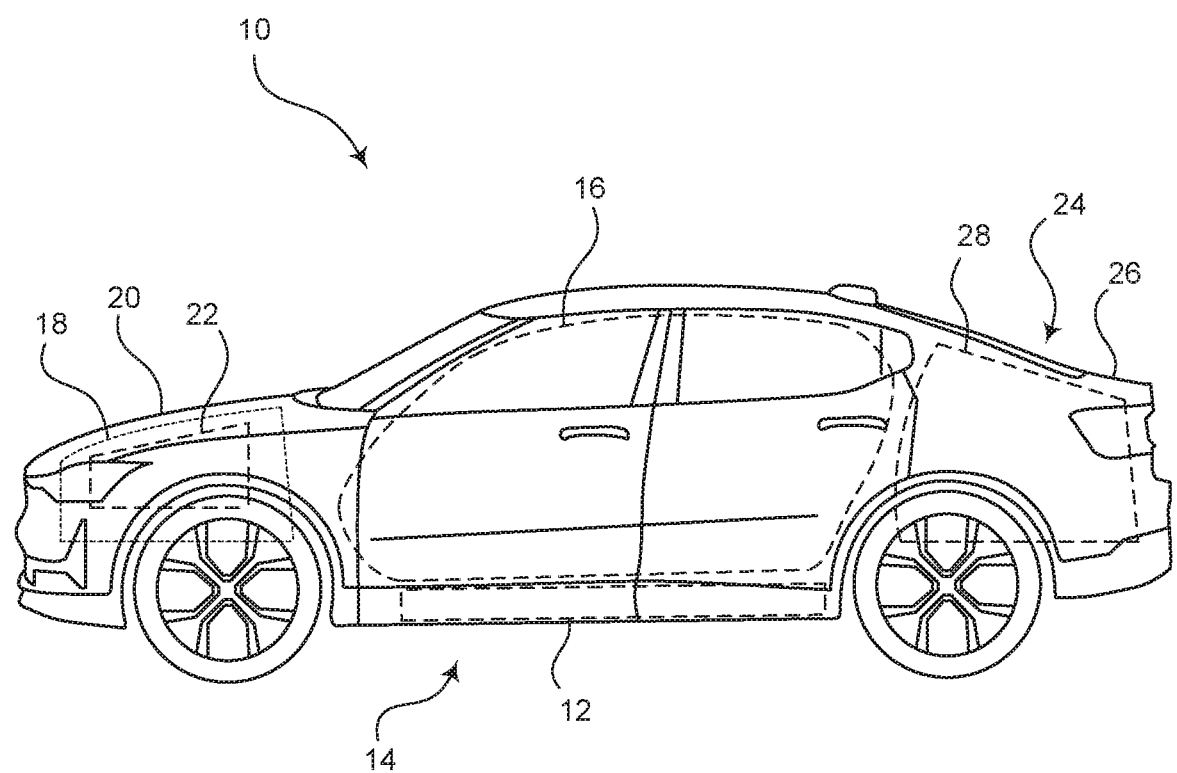
FIG. 1 is a diagram showing a side view of a vehicle that may be adapted to include a storage compartment having various features described in the present disclosure, according to various embodiments.

According to the present disclosure, storage compartments for installation in a vehicle are described which overcome many of the issues of conventional storage compartments. For example, the storage compartments of the present disclosure include a fabric cover that lays over a top of a container. With a cover, not only can the storage compartments be installed within environmentally protected spaces, such as within the passenger cabin or trunk of a vehicle, but they can also be installed in or on the vehicle at locations where the stored items might otherwise be subjected to the environment, such as on the exterior of a vehicle or under the hood of the vehicle. Thus, the fabric cover may be able to protect the items stored within the container from adverse elements in the environment. As such, the storage compartments may be installed as a frunk under the front hood of a vehicle where these spaces may typically be exposed to dust, smoke, or other elements in the environment.

Furthermore, the cover described with respect to various embodiments of the present disclosure may include certain features that are an advantage over conventional frunks or other covered storage compartments. For example, instead of a conventional plastic lid covering a container of a storage compartment, the lids or covers described herein may include a flexible material, such as a fabric or textile material. Thus, when the cover is opened, the fabric material can easily be moved to various positions so as not to obstruct the user as he or she inserts items into the container or removes items from the container.

Also, the fabric material may naturally permit a certain amount of flexibility with respect to the overall size and shape of the storage space of the storage compartment. Otherwise, with a large, bulky plastic lid having a fixed size and shape and hinged to pivot in one direction as used in conventional systems, the conventional lid may not be able to close properly if a stored item extends slightly outside the normal storage space where the closed lid would be positioned. However, with the flexible material as disclosed herein, the cover can still be closed over the items and may stretch outward slightly to accommodate these items.

Another advantage of using fabric material in place of a hinged plastic lid is that a fabric cover may be less expensive to manufacture than the plastic lid. The use of a fabric material for a cover of a storage compartment in this environment has another advantage in that the fabric is much less bulky that a plastic lid. Thus, the size of the container can be designed to be larger and still be able to fit in a small space, and the fabric cover does not add a significant amount to the height of the container that might otherwise interfere with other spaces of a vehicle. These benefits, advantages, and improvements of fabric covers over conventional plastic lids in the manufacture of vehicle storage compartments can be realized by the embodiments and implementations described in the present disclosure.

FIG. 1 is a side view of a vehicle 10 having one or more storage compartments. In particular, the vehicle 10 includes at least one storage compartment, as described in the present disclosure, which includes a cover constructed at least partially with a fabric or textile material.

In some embodiments, the vehicle 10 may be an electric vehicle having electrical components (e.g., batteries) 12 for propelling the vehicle 10. Many of the electrical components 12 for driving the vehicle 10 may be positioned in a bottom portion 14 of the vehicle 10 below a passenger cabin 16. As such, the electric vehicle 10 of course does not include an internal combustion engine in a front space 18 under a front hood 20 of the vehicle 10. Thus, the extra front space 18 may accommodate a frunk 22 under the front hood 20. As defined herein, a "frunk" is a storage compartment or "trunk" that may be positioned near the front of the vehicle under the hood. Some frunks 22 may be designed so as not to obstruct access to certain parts of the vehicle that may reside under the hood 20.

Many of the electrical components 12 for driving an electric vehicle may instead be positioned within a back space 24 of the vehicle 10 where a trunk may normally be located. Thus, when the vehicle 10 is configured as an electric vehicle, the front space 18 under the front hood 20 that may normally include the engine and other components may in this case have a cavity.

Alternatively, the vehicle 10 may be configured with a rear-mounted engine within a back space 24 under a trunk door 26 of the vehicle 10. In this embodiment, the trunk door 26 may not be configured to conceal a typical trunk, but instead may be configured to conceal the rear-mounted engine. Again, with such a design, the front space 18 may be available to accommodate the frunk 22.

In other embodiments, the vehicle 10 may be configured as a hybrid vehicle, which is driven by both gasoline and electrical power. A small internal combustion engine may be mounted under the front hood 20 or in the back space 24 under the trunk door 26, while the battery components of the hybrid engine may be mounted in the bottom portion 14 of the vehicle 10 under the passenger cabin 16 or mounted in the back space 24 under the trunk door 26. When configured as a hybrid vehicle, the vehicle 10 may include storage compartments (e.g., frunk 22, trunk 28) that may be accessible by lifting the front hood 20 or trunk door 26.

Regardless of the type of power train, design, or model of the vehicle 10, the vehicle may include storage compartments located at various locations, such as in the front space 18, the back space 24, or even within the passenger cabin 16 of the vehicle 10. In some embodiments, the vehicle 10 may include a bed (e.g., on a pick-up truck), a roof-rack, a trunk-rack, bumper, or other storage areas that are located on an exterior of the vehicle 10 and/or at other spaces within the vehicle 10. Some of the spaces (e.g., the back space 24 and the passenger cabin 16) may be somewhat isolated from the environment, while other spaces (e.g., the front space 18 and/or exterior spaces) may be exposed to the environment to some extent.

Figure 2:
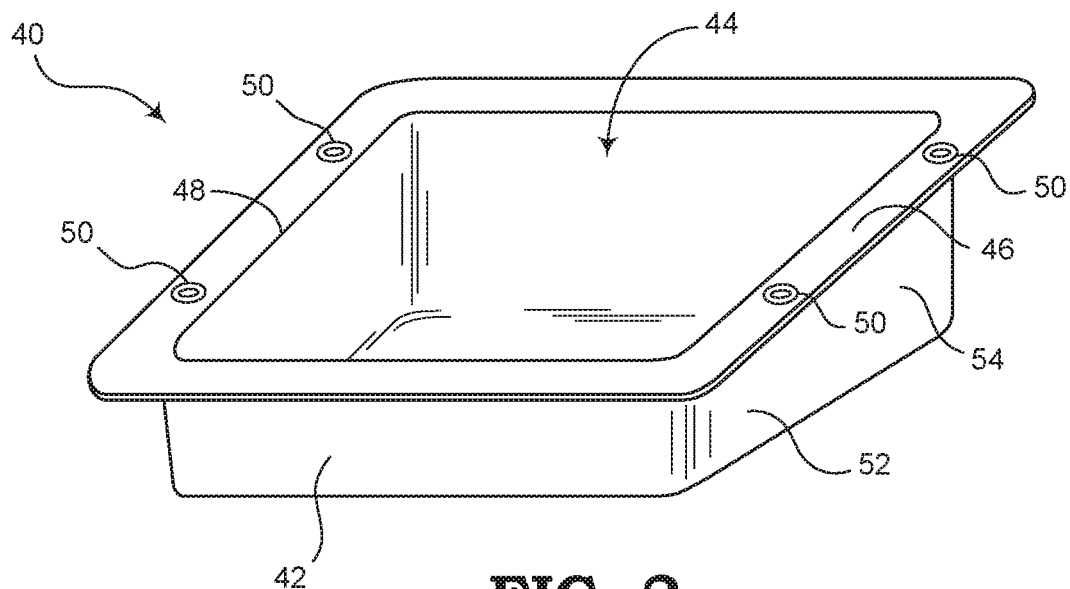
FIG. 2 is a diagram showing a perspective view of a container of a storage compartment according to various embodiments.

FIG. 2 is diagram illustrating an embodiment of a storage compartment 40 having a container body 42. The container body 42 includes a cavity 44 that is adapted to store various types of items or cargo. The container body 42 may include any suitable shape or design for allowing the storage compartment 40 to fit within various free spaces on or in the vehicle 10 as described above.

The storage compartment 40 further includes a rim 46 that extends outward from a top edge 48 of the container body 42. Also, the storage compartment 40 may include a plurality of connection members 50 that are formed in or on the rim 46, pass through the rim 46, and/or are attached to the rim 46. The connection members 50 are adapted to secure the storage compartment 40 to the vehicle 10. In some embodiments, the connection members 50 may be openings or screw holes for accommodating bolts or screws. In other embodiments, the connection members 50 may include hooks or loops of a hook and loop (i.e., Velcro) connection system. Alternatively, the connection members 50 may include grommets, ties, snaps, and/or other types of elements used for connecting. According to some embodiments, the rim 46 may be constructed with plastic, where the connection members 50 may include any suitable components for connecting the plastic rim 46 to a support structure of the vehicle 10.

For example, when the storage compartment 40 is configured as a frunk 22 that is located in the front space 18 under the front hood 20, the connection members 50 of the storage compartment 40 may be connected to support structure (e.g., a frame of the vehicle 10) under the hood 20. Also, the storage compartment 40 may be secured to a support structure in the trunk 28 of the vehicle 10. In still other embodiments, the storage compartment 40 may be positioned within the passenger cabin 16 or in other areas where there is free space in the interior of the vehicle 10. Also, in yet other embodiments, the storage compartment 40 may be secured to exterior components of the vehicle 10 (e.g., support structures on a bed of a pick-up truck, a roof-rack, a trunk-rack, a bumper, a hitch, etc.).

The storage compartment 40 may include any shape, width, height, depth, etc., and may be designed with specifications to fit within any free space having any size or shape. In some embodiments, the storage compartment 40 may have a size and shape to be adapted as a glove compartment, a driver console, a behind-the-seat compartment, an arm rest console, or any other various compartments or storage spaces within the vehicle 10.

In particular, the storage compartment 40 may be further adapted without a conventional plastic lid. Instead the storage compartment 40 may include a fabric or textile cover (not shown in FIG. 2) connected to the rim 46 of the storage compartment 40. The fabric cover may include a flap cut into the entire fabric piece. The flap may allow the cover to be closed to conceal the cargo or items stored in the cavity 44 and may also allow the cover to be opened to reveal the stored cargo.

The flap may be arranged on the storage compartment 40 in a concealing fashion to conceal the contents of the cavity 44 and/or can be displaced (i.e., disconnected or detached) from the storage compartment 40 in a revealing fashion to uncover the contents of the cavity 44. The fabric cover may also include an outside portion or edge that can be connected to the top edge 48 and/or rim 46 of the container body 42. Although the connection members 50 are adapted to be used for connecting the storage compartment 40 to support structure of the vehicle 10, the connection members 50 may also be used in some embodiments to attach the fabric cover to the storage compartment 40. The fabric cover is described in more detail below with respect to FIGS. 3-5.

As shown in FIG. 2, the container body 42 may have a shape that conforms to an empty space within the vehicle 10 where the container body 42 can be placed. The connection members 50 are arranged around the rim 46 at locations corresponding to connection points on the frame (or other support structure) in or on the vehicle 10.

The container body 42 may have a shape where the top edge 48 and/or rim 46 is substantially planar, such that the fabric cover that covers the top edge 48 can be held substantially taut without wrinkling. The plane defined by the top edge 48 or rim 46 can be horizontal with respect to a ground plane on which the vehicle 10 rests. Alternatively, in some embodiments, such as the embodiment shown in FIG. 2, the plane defined by the top edge 48 or rim 46 may be angled slightly. For example, the angled plane may include a front portion 52 of the container body 42 that is shallower than a back portion 54 of the container body 42. Also, the fabric cover, when closed, may be configured to lie substantially within the plane defined by the top edge 48 or rim 46.

The container body 42 may include plastic, thermoplastic, polymer, or other suitable materials having sufficient strength for bearing the weight of various items that may be stored within the cavity 44. For example, the container body 42 may be formed using any suitable manufacturing process, such as by compression molding, injection molding, etc.

Figure 3:
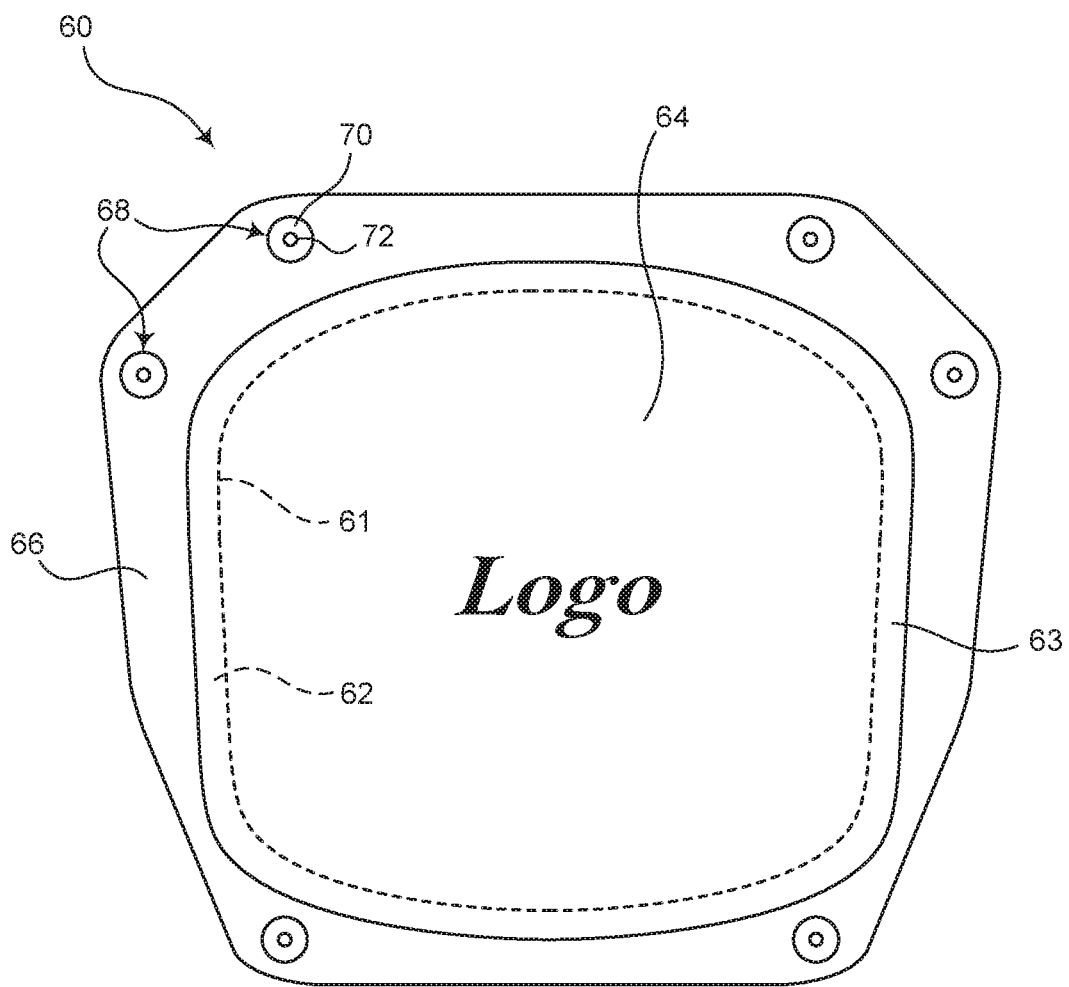
FIG. 3 is a diagram showing a top view of a storage compartment according to various embodiments.

FIG. 3 is a top view showing a storage compartment 60 according to another embodiment. The storage compartment 60 includes a container body, which is not shown in FIG. 3 but may be similar to the container body 42 shown in FIG. 2. The container body may also have a cavity adapted to store various items or cargo. The container body may include a corner 61 at a top of an inner surface of the container body. This corner 61 may be rounded, square, or may include any other suitable cross-sectional shape. Also, the container body includes a top edge 62 adjacent to the corner 61, where the top edge 62 may define an area where an outer edge 63 of a fabric cover 64 can be connected. The container body of the storage compartment 60 may include a plastic material and the fabric cover 64 may include a textile material.

The storage compartment 60 further includes a rim 66. The rim 66 may have a top surface that resides in the same plane as the top edge 62 of the container. In other embodiments, the rim 66 may be recessed below the surface of the top edge 62 and may include any suitable shape for attachment with support structure in the vehicle 10. The top edge 62 of the container body may be configured to lie substantially within an inclined plane, similar to the container body 42 shown in FIG. 2.

In some embodiments, the rim 66 and container body may be formed as one piece (e.g., in the same injection molding process). However, in other embodiments, the rim 66 may be manufactured separately from the container body and may be permanently or removably connected to the container body. When manufactured separately and attached together, according to some embodiments, the fabric cover 64 may be folded around the top edge 62 such that the outer edge 63 of the fabric cover 64 is sandwiched between the top edge 62 and the rim 66 when the rim 66 is attached to top edge 62.

In some embodiments, a groove may be formed around the periphery of the top edge 62 and/or rim 66, whereby, according to one manufacturing process, the outer edge 63 of the fabric cover 64 may be inserted into the groove and attached thereto by pressing a spline or other type of wedge member into the groove. The fabric cover 64 may be connected to the top edge 62 using other suitable types of connection processes involving various types of connection components. Alternatively, the outer edge 63 of the fabric cover 64 may be adhered to the top edge 62 using an adhesive, wax, solder, heat fusion compounds, etc.

The rim 66 may include one or more connection members 68, which may be arranged around the rim 66 at locations corresponding to compatible connection elements of a frame or other support structure of the vehicle 10. For example, as illustrated, each of the connection members 68 of the rim 66 may include a recess 70 and an opening or aperture 72. In this embodiment, the storage compartment 60 may be secured on the vehicle 10 using bolts or screws that are inserted through the openings 72, whereby the heads of the bolts or screws may be pressed against the recesses 70. The bolts or screws can then be connected to corresponding connection elements of the vehicle frame using nuts or other threaded connectors. In other embodiments, the storage compartment 60 may be secured to the vehicle 10 using plastic locking tabs that can be pressed through the openings 72 and through matching openings in the frame or support structure of the vehicle 10.

Thus, according to these or other suitable connection processes, the storage compartment 60 is adapted to be secured to the vehicle 10. For example, the container body of the storage compartment 60 may be placed within and secured to a trunk 28 or frunk 22 of the vehicle 10. The storage compartment 60 can therefore be accessible by lifting the trunk door 26 or the front hood 20, respectively.

Figure 4:
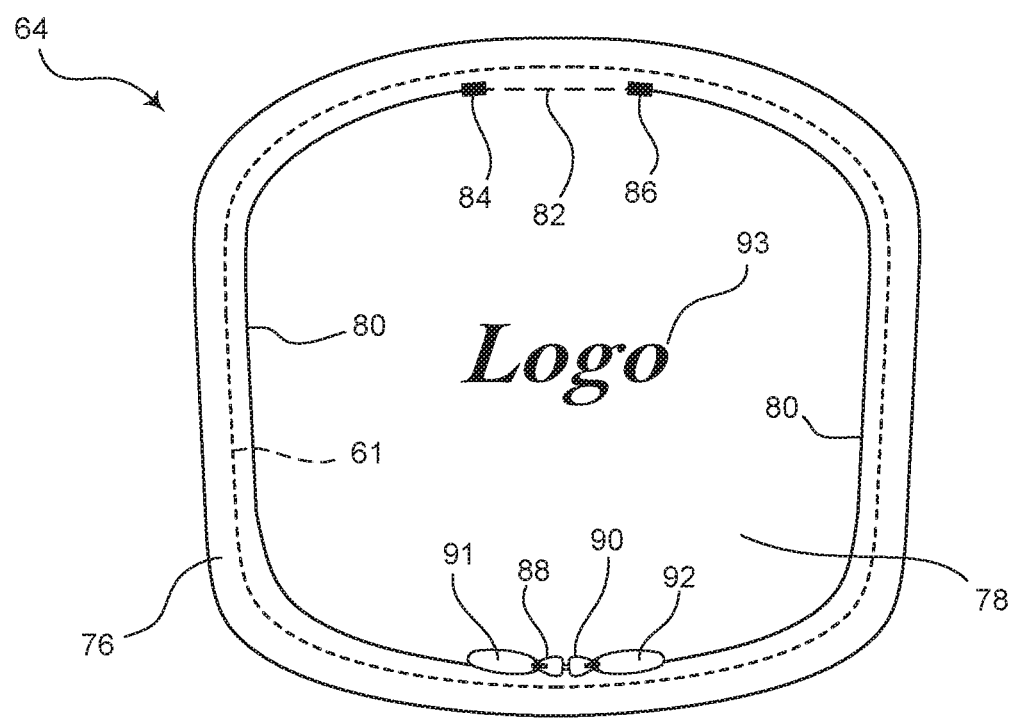
FIG. 4 is a diagram showing a cover of the storage compartment of FIG. 3, according to various embodiments.

FIG. 4 is a top view of the fabric cover 64 shown in FIG. 3. The fabric cover 64, in this embodiment, includes a frame section 76 and a flap 78. Regarding the flap 78, a first peripheral section of its outer edge (e.g., right, left, and bottom edge portions of the flap 78 as shown in FIG. 4) is removably connected to a corresponding first section of an inner edge of the frame section 76. These sections of the frame section 76 and flap 78 may be removably connected by one or more zippers 80.

A second section of the outer edge of the flap 78 (e.g., a top edge portion of the flap 78 as shown in FIG. 4) is connected to a corresponding second section of the inner edge of the frame section 76 along a fold line 82. The fold line 82 defines an approximate imaginary line extending from an end 84 of the zipper 80 to another end 86 of zipper 80, in the embodiment where the zipper 80 extends almost entirely around the periphery of the flap 78. The fold line 82 defines where the fabric is not cut and/or where the flap 78 joins or is connected to the frame section 76 of the fabric cover 64.

The frame section 76 of the fabric cover 64 may be attached to the top edge (e.g., top edge 62 shown in FIG. 3 extending outward from the corner 61 of the container body). An adhesive may be used to attach the frame section 76 of the fabric cover 64 to the top edge 62 of the container body.

When the first removable section of the outer edge of the flap 78 is disconnected from the inner edge of the frame section 76, such as by unzipping the zipper 80, the flap 78 is adapted to be displaced in a way that exposes the cavity of the container body. For example, when disconnected, the flap 78 can be rolled up in a way without contacting the underside of the front hood 20 of the vehicle 10 as conventional frunk lids might do.

Also, the fabric cover 64 may further include one or more pairs of ties (not shown). Each pair of ties may be attached to the cover 64, where one tie can be connected to a top surface of the cover 64 and the other tie can be connected to a bottom surface of the cover 64. The pairs of ties may be connected to the cover 64 near the fold line 82. Thus, when the flap 78 is rolled up, the ties can be used to tie the flap 78 in this opened position, thus allowing a user to easily insert items into the container body and/or remove items from the container body as needed without being concerned with holding a lid open or working the items around the lid.

The one or more zippers 80 may be adapted to removably connect the first section of the outer edge of the flap 78 (e.g., the outer edges of the flap 78 excluding the fold line 82) to associated portions of the inner edge of the frame section 76 (e.g., the inner edges of the frame section 76 excluding the fold line 82). The zipper 80 is configured for fastening or unfastening the adjacent edges of the flap 78 and frame section 76.

Each edge of the flap 78 and frame section 76 may be lined with a plurality of interlocking tabs. During a zipping process of connecting the flap 78 to the frame section 76, the interlocking tabs can be interconnected by one or more sliding mechanisms 88, 90. During an unzipping process of disconnecting the flap 78 from the frame section 76, the interlocking tabs can be separated from each other using one or both of the sliding mechanisms 88, 90. For example, the cover 64 may include a first sliding mechanism 88 and a second sliding mechanism 90 adapted to join or separate the interlocking tabs of the corresponding edges of the flap 78 and frame section 76.

Also, the first sliding mechanism 88 may be configured with a first pull 91 and the second sliding mechanism 90 may be configured with a second pull 92. The pulls 91, 92 are used by the user to move the sliding mechanisms 88, 90 as needed. Furthermore, in order to meet safety standards in some countries (e.g., the U.S.) regarding possible ways for a person to escape from a trunk or other compartments, the zipper 80 may be adapted such that the sliding mechanisms 88, 90 include the pulls 91, 92 on the outside (as shown in the top view of FIG. 4) and also additional pulls on the inside. Thus, if a person is trapped inside storage compartment 60, the inside pulls can be used to open the flap 78.

The first sliding mechanism 88 may be able to disengage the interlocking tabs by moving the first sliding mechanism 88 along the zipper 80 in a direction toward the first end 84 of the zipper 80. The second sliding mechanism 90 may be able to disengage the interlocking tabs by moving the second sliding mechanism 90 along the zipper 80 in a direction toward the second end 86 of the zipper 80. When, the first and second sliding mechanisms 88, 90 are moved to the ends 84, 86 of the zipper 80, the flap 78 is separated from the frame section 76 and can be moved out of the way, such as by folding the flap 78 along the fold line 82 and/or by rolling the flap 78 toward a back end of the rim 66.

The zipper 80 may include a first strip of fabric material that is attached to the teeth or tabs on one side of the zipper 80 and a second strip of fabric material that is attached to the teeth or tabs on the other side of the zipper 80. The first strip of fabric material may be sewn to the inside edge of the frame section 76 and the second strip of fabric material may be sewn to the outside edge of the flap 78.

Additionally, the first and/or second strips of fabric material and/or the adjoining edges of the frame section 76 and flap 78 may further include a sealing material arranged to cover the teeth or tabs when the zipper 80 is closed. For example, the sealing material may include a rubber material or other waterproof material for repelling water or other elements. When the frame section 76 and flap 78 are held together in a closed state, the rubber/waterproof materials may be positioned on both sides of the zipper 80 and may contact or overlap each other from both sides. In alternative embodiment, the rubber/waterproof materials may include a single piece positioned one just one side and being adapted to overlap the zipper 80 from that side. With either of these embodiments, the zipper 80 may still be able to be zipped closed or unzipped open with minimal interference from the rubber/waterproof material.

In addition, some embodiments may include the fabric cover 64 with a single sliding mechanism (i.e., one of the sliding mechanisms 88, 90) instead of two sliding mechanisms or pulls. This embodiment may be preferable in some scenarios. For example, with only a single sliding mechanism, a space will not form between the sliding mechanisms that may allow water or other elements to enter the storage compartment 60.

Also, an end (e.g., one of ends 84, 86) of the zipper 80 may be adapted to include a zipper pouch in which the pull or sliding mechanism can be inserted when the zipper 80 is closed. This zipper pouch may also provide the benefit of preventing or reducing the amount of water or other elements from entering at that end.

Therefore, by protecting the zipper and preventing extra spaces where water can enter, the zipper 80 can remain operational, even in the event that the cover 64 is exposed to water. Also, some environments may be more susceptible to freezing conditions. Thus, by reducing or eliminating water on the zipper 80, the zipper 80 can still be operated in freezing condition when that water freezes.

It should be noted that the fabric cover 64 may include more than just fabric or textile materials. For example, the cover 64 may include the zipper 80, which may comprise plastic, metal, or other suitable materials. In place of the zipper 80, the cover 64 may include other types of connection features, such as hook and loop (e.g., Velcro) elements, which may comprise plastic, felt, or other suitable materials. Also, the fabric cover 64 may include connection members such as buttons, snaps, tabs, etc., made of metal, plastic, or other materials, for connecting the cover 64 to corresponding connection members on the top edge 62 of the container body.

Furthermore, the parts of the cover 64 that are described in the present disclosure as including fabric or textile material (i.e., the frame section 76 and the flap 78) may include additional structure and/or materials. For example, the frame section 76 and/or flap 78 may include cardboard or plastic support elements, such as elements that may be used in luggage or backpacks, to provide a more rigid shape. Also, the frame section 76 and/or flap 78 may include two or more layers of fabric sewn together for added strength. In this regard, a protective padding or filler material (e.g., cloth, down, etc.) may be inserted in between the layers of fabric.

In still other embodiments, the flap 78 may be configured with additional features. For example, pouches, similar to those that may be used in a backpack or piece of luggage, may be sewn onto an upper or lower surface of the flap 78. Also, a graphical image 93 or other pictures, logos, vehicle instructions, images, and/or text may be printed or otherwise applied to the surfaces of the flap 78.

Figure 5:
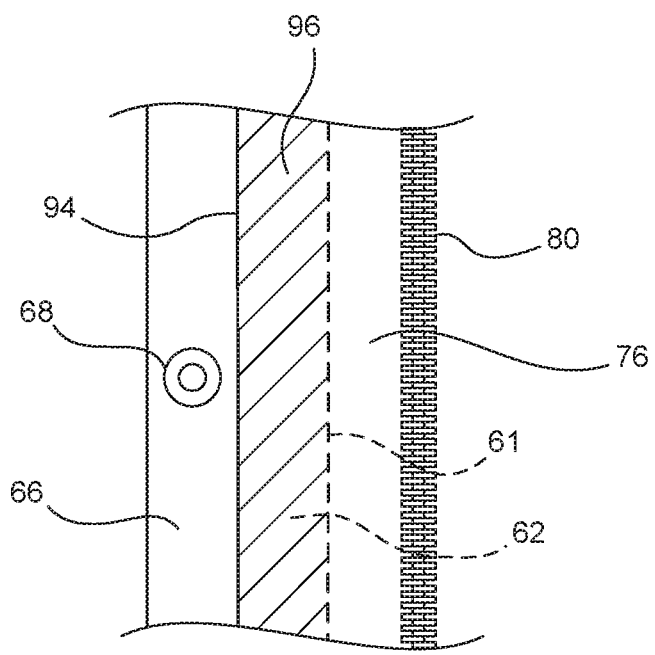
FIG. 5 is a diagram showing a sectional view of an edge of the storage compartment of FIG. 3, according to various embodiments.

FIG. 5 illustrates a sectional view of an edge of the storage compartment 60 of FIGS. 3 and 4. As shown, the rim 66 includes at least one connection member 68 for connecting the storage compartment 60 with structural supports of the vehicle 10. The fabric of the cover 64 may be stretched out over the top edge 62 of the container body extending outward from the top corner 61 of the container body. Portions or all of the top edge 62 may include an area (illustrated in FIG. 5 by the shaded area) that may be defined as an attachment area 96 where the fabric can be attached to the top edge 62.

In some embodiments, an outer edge 94 of the frame section 76 of the cover 64 may extend out to or beyond the rim 66. For example, if the cover 64 extends further than the top edge 62, the fabric of the cover 64 may include additional openings or attachment members to attach to connection members 68, or may extend such that the fabric does not interfere with the connection members 68.

Also shown in FIG. 5 is the zipper 80, which is illustrated in its connected state where the flap 78 is connected to the frame section 76. The interlocking tabs on each side of the zipper 80 are interlocked in the connected state. In some embodiments, the zipper 80 may be positioned (as shown in FIG. 5) with a small distance from the corner 61 of the container body. However, in other embodiments, the zipper 80 may be positioned above the corner 61 and/or above the top edge 62.

According to some embodiments of the present disclosure, the frunk 22 under the front hood 20 of the vehicle 10 may include the storage compartment 60. Thus, the frunk 22 may include a container having a body (e.g., container body 42), a top edge (e.g., top edge 62) of the body, and a rim (e.g., rim 46, 66) extending outward from the top edge 62. The body (or cavity 44) of the container may be adapted to store cargo or any type of items (e.g., luggage, groceries, auto parts, umbrellas, folding chairs, etc.). The rim 46, 66 of the frunk 22 may be adapted to be secured to support members under the front hood 12 of the vehicle 10. A cover (e.g., cover 64) may be adapted to conceal the cargo stored in the body of the container.

The cover 64 in some embodiments may include a frame section 76 and a flap 78, where the frame section 76 may be adapted to be attached to the top edge 62 of the container body. A first section of an outer edge of the flap 78 may be removably connected to a first section of an inner edge of the frame section 76 and a second section of the outer edge of the flap 78 may be connected to a second section of the inner edge of the frame section 76 along the fold line 82. The frunk 13, according to some embodiments, may further include one or more zippers (e.g., zipper 80) adapted to removably connect the first section of the outer edge of the flap 78 to the first section of the inner edge of the frame section 76.

In accordance with other embodiments of the present disclosure, an electric vehicle is provided. For example, the vehicle 10 may be adapted as an electric vehicle having electrical components 12 for driving the vehicle 10. The electric vehicle may include a frame or other type of support structure that may be adapted to support vehicle parts, or even an engine (e.g., for a hybrid vehicle) or electric motor for propelling the electric vehicle. The frame or support structure may also be adapted for supporting other electrical and/or mechanical equipment of the electric vehicle 10, such as components of the electric vehicle 10 not necessarily associated with driving or propelling the vehicle. As such, the electric vehicle according to this embodiment further may include a storage compartment (e.g. storage compartment 40, 60), which may be secured to this frame or support structure.

The storage compartment 40, 60 of the electric vehicle may include a plastic container (e.g., container body 42) and the fabric cover 64. The plastic container may have a cavity (e.g., cavity 44) adapted to store cargo or other items to be transported by the vehicle 10. The electric vehicle may further be adapted such that an outer edge of the fabric cover 64 is further adapted to be attached to a top edge (e.g., top edge 62) of the plastic container. The fabric cover 64 may include the frame section 76 and the flap 78, where a first section of an outer edge of the flap 78 is removably connected to a first section of an inner edge of the frame section 76. When the first section of the outer edge of the flap 78 is disconnected from first section of the inner edge of the frame section 76, the flap 78 is adapted to be displaced in a way that exposes the cavity of the plastic container.

The electric vehicle 10 may further include one or more zippers (e.g., zipper 80) adapted to removably connect the first section of the outer edge of the flap 78 to the first section of the inner edge of the frame section 76. The electric vehicle 10 may further include a rim 46, 66 extending outward from the top edge of the plastic container. The rim 46, 66 may be adapted to be secured to the frame or support structure of the vehicle 10. The storage compartment 40, 60 may be secured within the trunk 28 or frunk 22 of the electric vehicle 10 and may be accessible by lifting the trunk door 26 or the front hood 20, respectively, of the electric vehicle 10.

Although the present invention is illustrated and described herein with reference to preferred embodiments and specific examples thereof, it will be readily apparent to those of ordinary skill in the art that other similar embodiments and examples can perform similar functions and/or achieve like results. All such equivalent or similar embodiments and examples should be considered as being within the spirit and scope of the present invention, are contemplated thereby, and are intended to be covered by the following non-limiting claims.

What is claimed is:

1. A storage compartment of a vehicle, comprising:
a container body having a cavity adapted to store items or cargo, the container body adapted to be secured to the vehicle; and
a fabric cover attached to a top edge of the container body, wherein the fabric cover includes a frame section and a flap, wherein a first section of an outer edge of the flap is removably connected to a first section of an inner edge of the frame section by one or more zippers.

2. The storage compartment of claim 1, wherein a second section of the outer edge of the flap is connected to a second section of the inner edge of the frame section along a fold line.

3. The storage compartment of claim 1, wherein, when the first section of the outer edge of the flap is disconnected from first section of the inner edge of the frame section, the flap is adapted to be displaced in a way that exposes the cavity of the container body.

4. The storage compartment of claim 1, wherein the frame section of the fabric cover is attached to the top edge of the container body.

5. The storage compartment of claim 4, further comprising an adhesive adapted to attach the frame section of the fabric cover to the top edge of the container body.

6. The storage compartment of claim 1, further comprising a rim extending outward from the top edge of the container body.

7. The storage compartment of claim 6, wherein the rim is adapted to be attached to the vehicle.

8. The storage compartment of claim 7, wherein the rim includes a plurality of openings enabling a plurality of connectors to attach the rim directly to a support structure of the vehicle.

9. The storage compartment of claim 8, wherein the connectors include bolts or screws.

10. The storage compartment of claim 1, wherein the container body is secured within a trunk or frunk of the vehicle and is accessible by lifting a trunk door or a front hood of the vehicle.

11. The storage compartment of claim 1, wherein the top edge of the container body lies substantially within an inclined plane.

12. The storage compartment of claim 1, wherein the container body includes a plastic material and the fabric cover includes a textile material.

13. A vehicle frunk, comprising:
a container having a body, a top edge of the body, and a rim extending outward from the top edge, the body of the container adapted to store items or cargo therein, the rim adapted to be secured to support members under a front hood of the vehicle; and
a cover adapted to conceal the items or cargo stored in the body of the container, the cover including a frame section and a flap, the frame section adapted to be attached to a top edge of the container body, wherein the cover comprises at least a fabric material, wherein a first section of an outer edge of the flap is removably connected to a first section of an inner edge of the frame section, and wherein a second section of the outer edge of the flap is connected to a second section of the inner edge of the frame section along a fold line.

14. The frunk of claim 13, further comprising one or more zippers adapted to removably connect the first section of the outer edge of the flap to the first section of the inner edge of the frame section.

15. An electric vehicle, comprising:
a support structure adapted to support one or more vehicle components adapted to drive the electric vehicle; and
a storage compartment secured to the support structure, the storage compartment including a plastic container and a fabric cover, the plastic container having a cavity adapted to store cargo;
wherein an outer edge of the fabric cover is attached to a top edge of the plastic container;
wherein the fabric cover includes a frame section and a flap;
wherein a first section of an outer edge of the flap is removably connected to a first section of an inner edge of the frame section; and
wherein, when the first section of the outer edge of the flap is disconnected from first section of the inner edge of the frame section, the flap is adapted to be displaced in a way that exposes the cavity of the plastic container.

16. The electric vehicle of claim 15, further comprising a rim extending outward from the top edge of the plastic container, wherein the rim is adapted to be secured to the support structure.

17. The electric vehicle of claim 15, wherein the storage compartment is secured within a trunk or frunk of the electric vehicle and is accessible by lifting a trunk door or a front hood of the electric vehicle.

18. The storage compartment of claim 1, wherein the one or more zippers traverse the first section of the outer edge of the flap and the first section of the inner edge of the frame section.

19. The storage compartment of claim 2, wherein the first section of the outer edge of the flap and the first section of the inner edge of the frame section are relatively longer than the second section of the outer edge of the flap and the second section of the inner edge of the frame section.

20. The frunk of claim 13, wherein the first section of the outer edge of the flap and the first section of the inner edge of the frame section are relatively longer than the second section of the outer edge of the flap and the second section of the inner edge of the frame section.

21. The electric vehicle of claim 15, wherein the first section of the outer edge of the flap and the first section of the inner edge of the frame section comprise a majority of the outer edge of the flap and the inner edge of the frame section, respectively.

\* \* \* \* \*